(12) United States Patent
Kim et al.

(10) Patent No.: US 10,862,139 B2
(45) Date of Patent: Dec. 8, 2020

(54) MEMBRANE ELECTRODE ASSEMBLY FOR FUEL CELLS AND METHOD OF MANUFACTURING THE MEMBRANE ELECTRODE ASSEMBLY FOR FUEL CELLS

(71) Applicants: HYUNDAI MOTOR COMPANY, Seoul (KR); KIA MOTORS CORPORATION, Seoul (KR)

(72) Inventors: Yong Min Kim, Seongnam-si (KR); Bum Wook Roh, Seoul (KR); Seok Jung Park, Seoul (KR); Ki Sub Lee, Yongin-si (KR); Ha Yeong Yu, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/834,715

(22) Filed: Dec. 7, 2017

(65) Prior Publication Data

US 2018/0366745 A1 Dec. 20, 2018

(30) Foreign Application Priority Data

Jun. 19, 2017 (KR) ........................ 10-2017-0077549

(51) Int. Cl.
*H01M 8/0276* (2016.01)
*H01M 8/1004* (2016.01)
(Continued)

(52) U.S. Cl.
CPC ....... *H01M 8/0276* (2013.01); *H01M 4/8814* (2013.01); *H01M 4/8817* (2013.01); *H01M 4/8882* (2013.01); *H01M 4/8896* (2013.01);

*H01M 8/1004* (2013.01); *H01M 8/106* (2013.01); *H01M 8/1039* (2013.01);
(Continued)

(58) Field of Classification Search
CPC ............ H01M 8/1004; H01M 8/0271; H01M 8/0273; H01M 8/2076; H01M 8/12; H01M 8/0276; H01M 8/1039; H01M 8/1086; H01M 4/88

See application file for complete search history.

(56) References Cited

U.S. PATENT DOCUMENTS

| 2008/0178991 A1* | 7/2008 | Mah ...................... H01M 4/881 156/182 |
| 2009/0155662 A1* | 6/2009 | Durante ................. C08J 5/2281 429/500 |

(Continued)

FOREIGN PATENT DOCUMENTS

| KR | 10-0448168 B1 | 9/2004 |
| KR | 10-2008-0045461 A | 5/2008 |

(Continued)

*Primary Examiner* — Bethany L Martin
(74) *Attorney, Agent, or Firm* — Morgan, Lewis & Bockius LLP

(57) ABSTRACT

A membrane electrode assembly includes an electrolyte membrane stacked between different electrodes, wherein an ionomer layer of the electrolyte membrane comprises an adjacent electrode, a first layer having at least a same cross-sectional area as that of the adjacent electrode, a reinforcing layer and a second layer stacked at a side of the first layer, the second layer having at least the same cross-sectional area as that of the reinforcing layer.

6 Claims, 13 Drawing Sheets

(51) Int. Cl.
*H01M 4/88* (2006.01)
*H01M 8/1039* (2016.01)
*H01M 8/106* (2016.01)
*H01M 8/1062* (2016.01)
H01M 8/1018 (2016.01)
H01M 8/1086 (2016.01)

(52) U.S. Cl.
CPC ........ *H01M 8/1062* (2013.01); *H01M 8/1093* (2013.01); *H01M 2008/1095* (2013.01)

(56) References Cited

U.S. PATENT DOCUMENTS

| | | | |
|---|---|---|---|
| 2010/0000679 A1* | 1/2010 | Han | H01M 4/881 156/330 |
| 2013/0202986 A1* | 8/2013 | Moose | H01M 8/1004 429/482 |
| 2015/0180072 A1* | 6/2015 | Lee | B32B 29/002 156/308.2 |
| 2019/0036128 A1* | 1/2019 | Martinez Bonastre | H01M 4/9041 |

FOREIGN PATENT DOCUMENTS

| | | |
|---|---|---|
| KR | 10-1385729 B1 | 4/2014 |
| KR | 10-2016-0071800 A | 6/2016 |

\* cited by examiner

[FIG. 1]
PRIOR ART
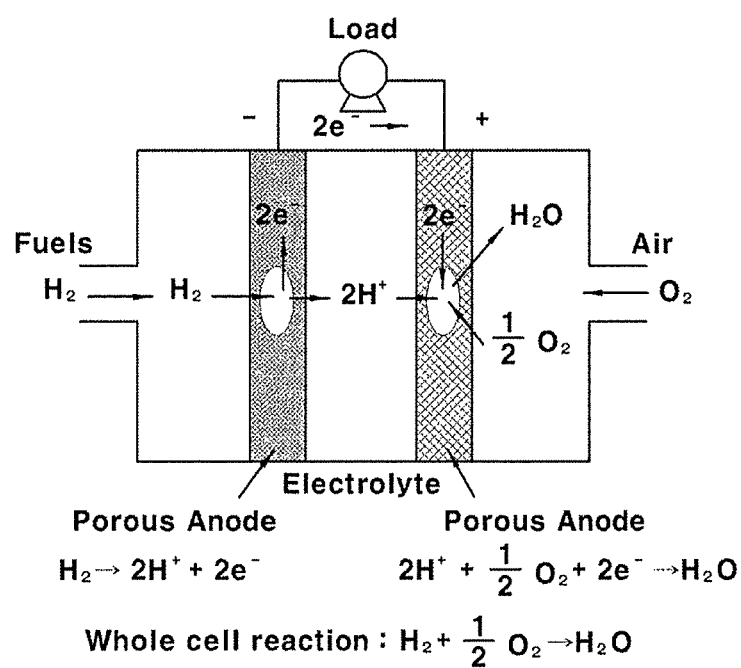

[FIG. 2]
PRIOR ART
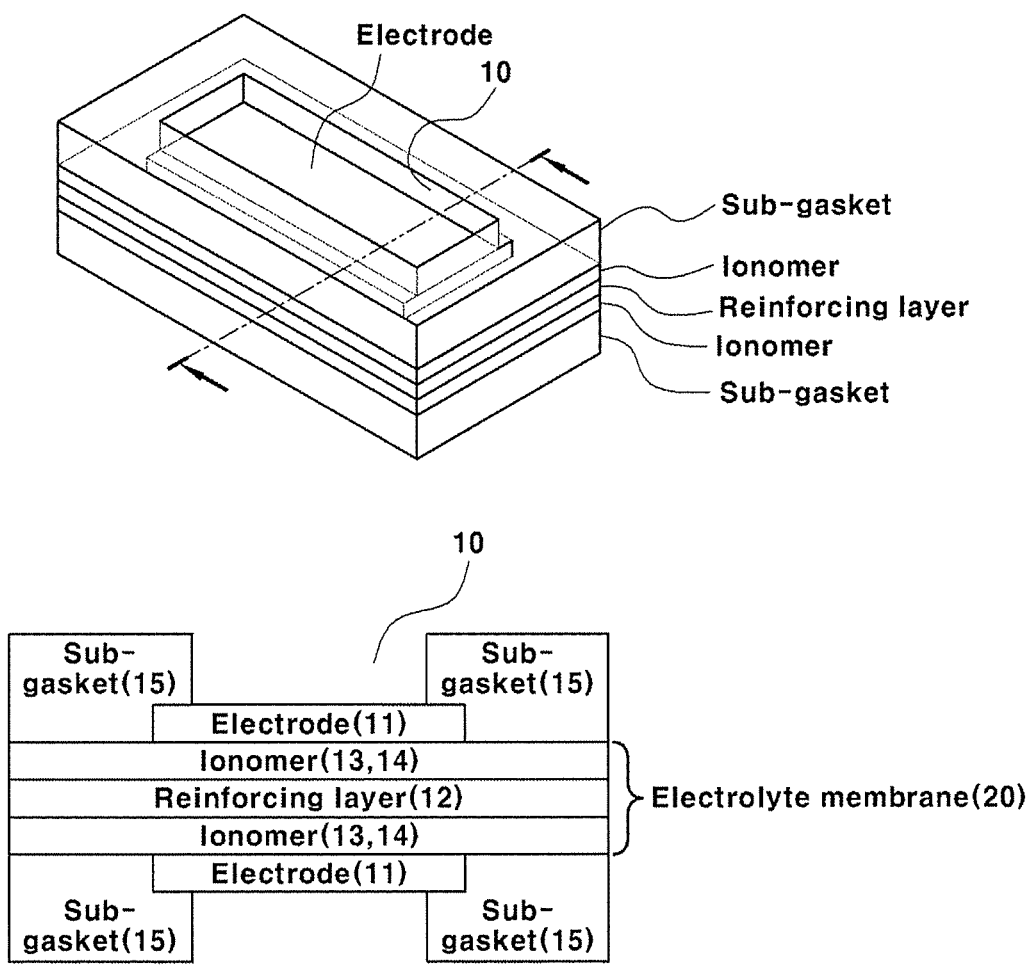

[FIG. 3]
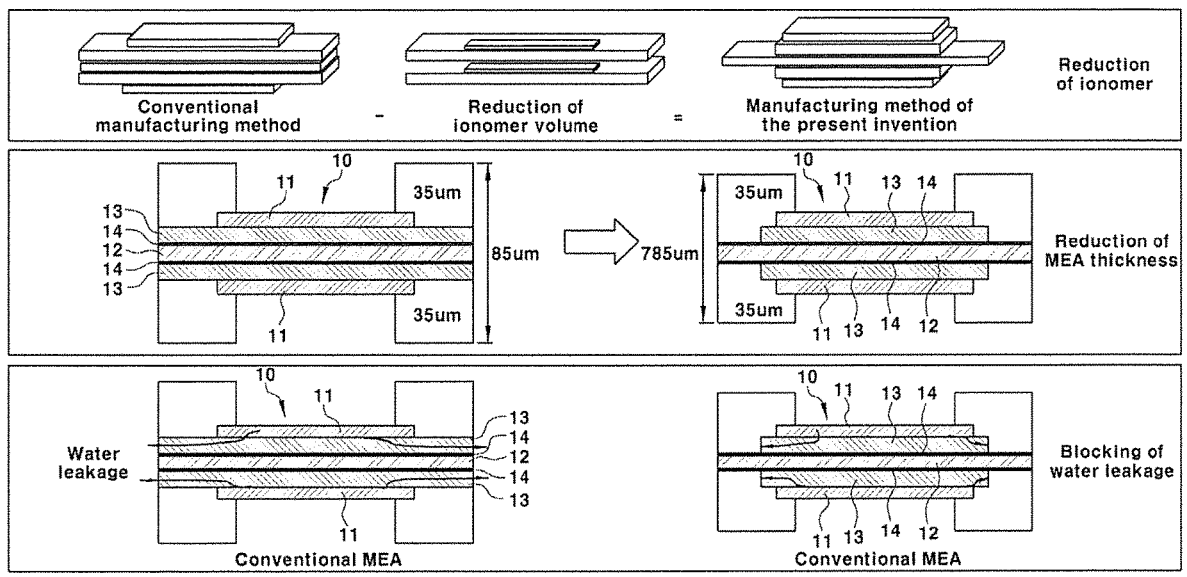

[FIG. 4]
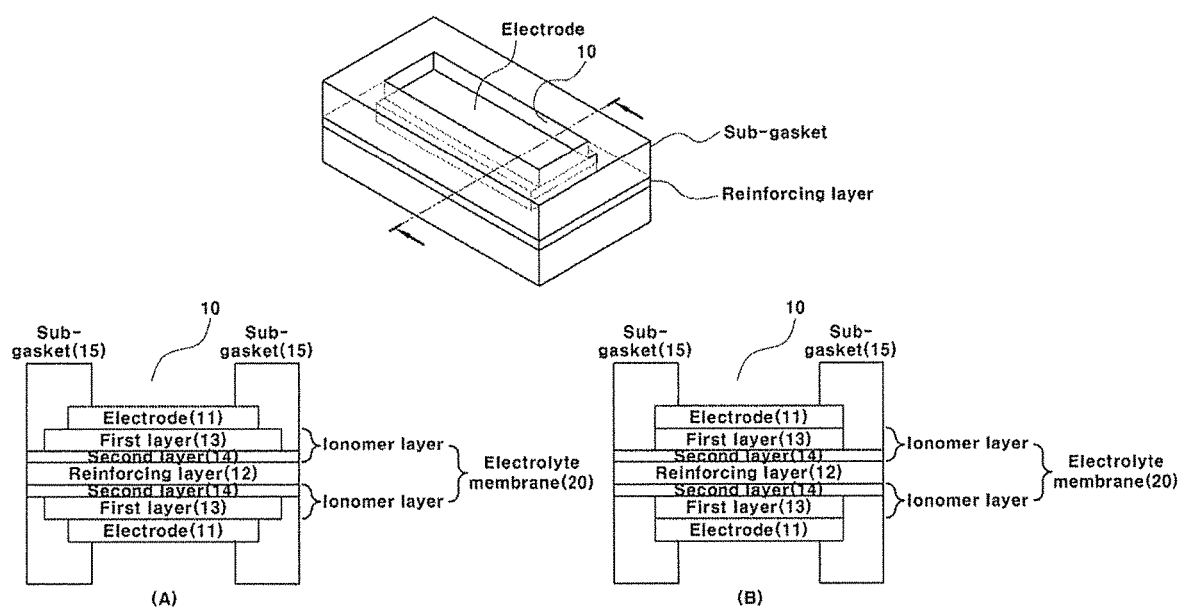

[FIG. 5A]
PRIOR ART
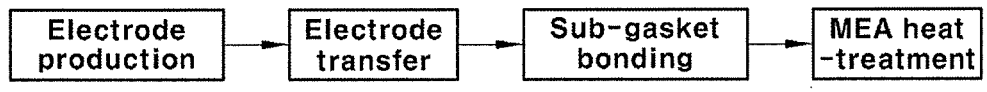
[FIG. 5B]
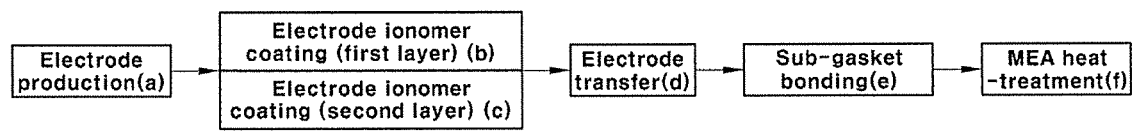

[FIG. 6]
PRIOR ART
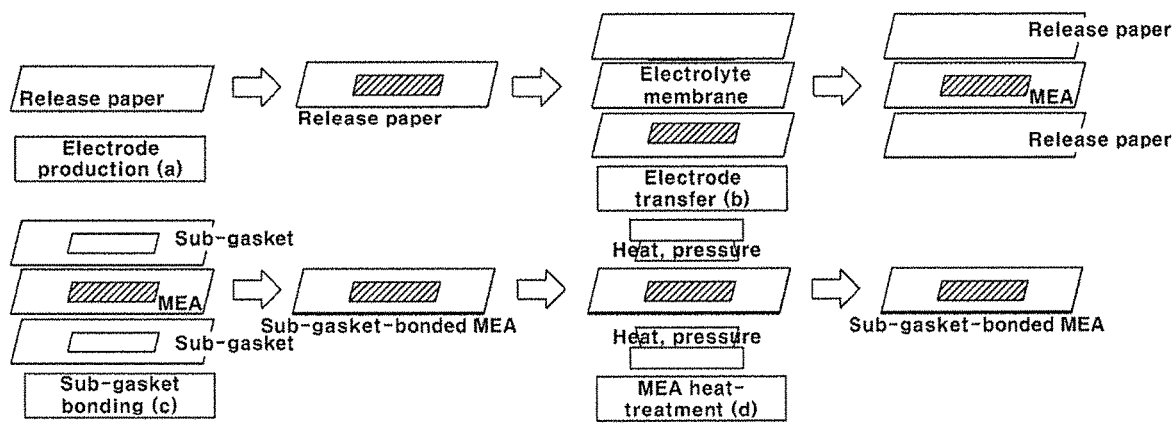

[FIG. 7]
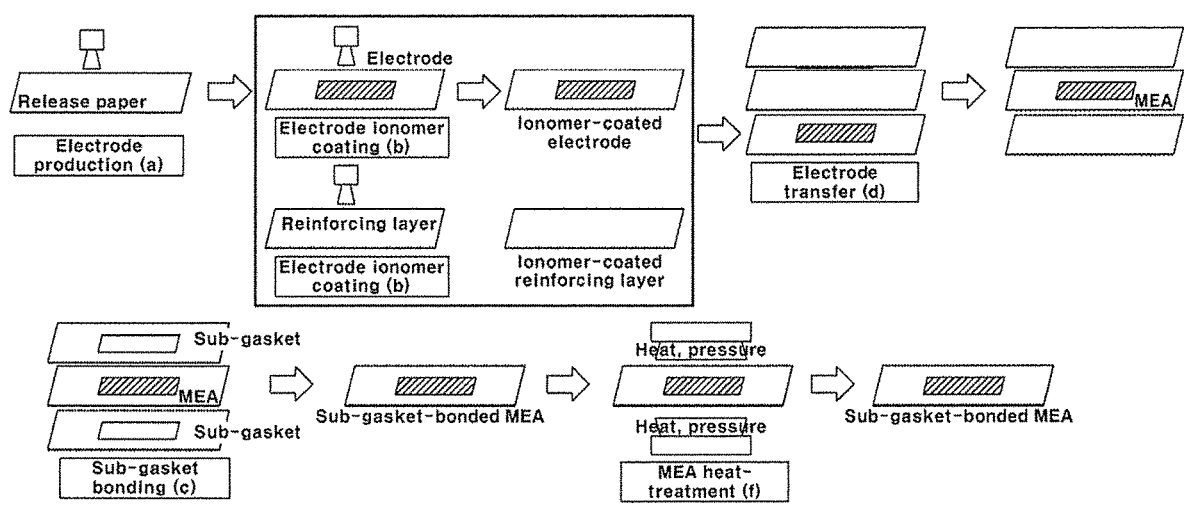

[FIG. 8]
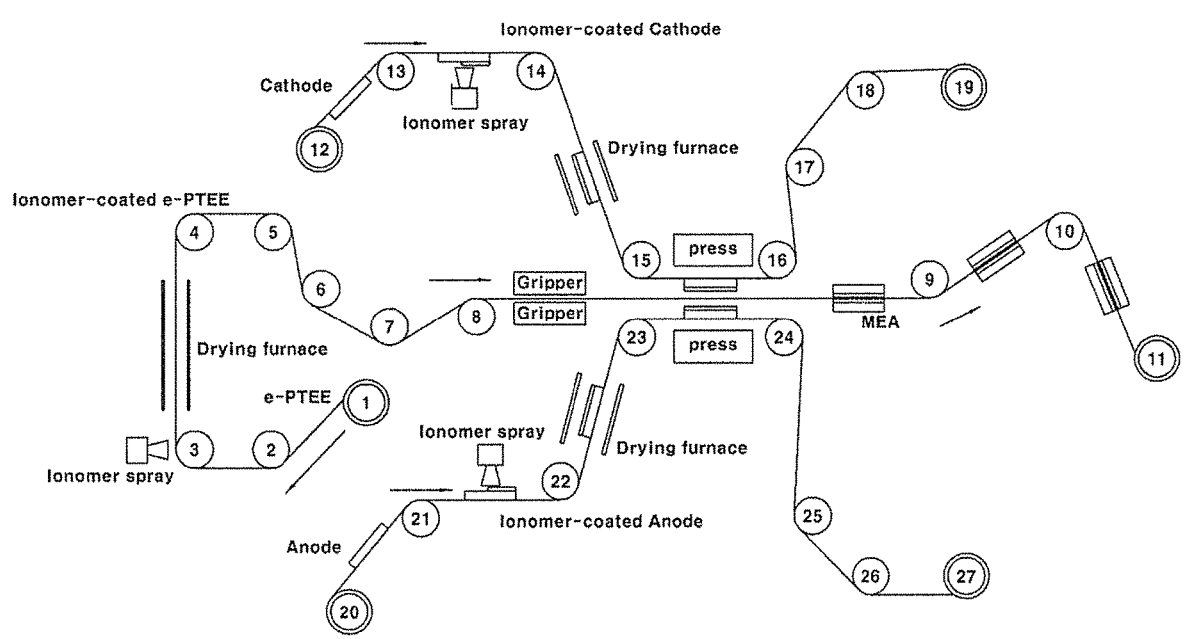

[FIG. 9]
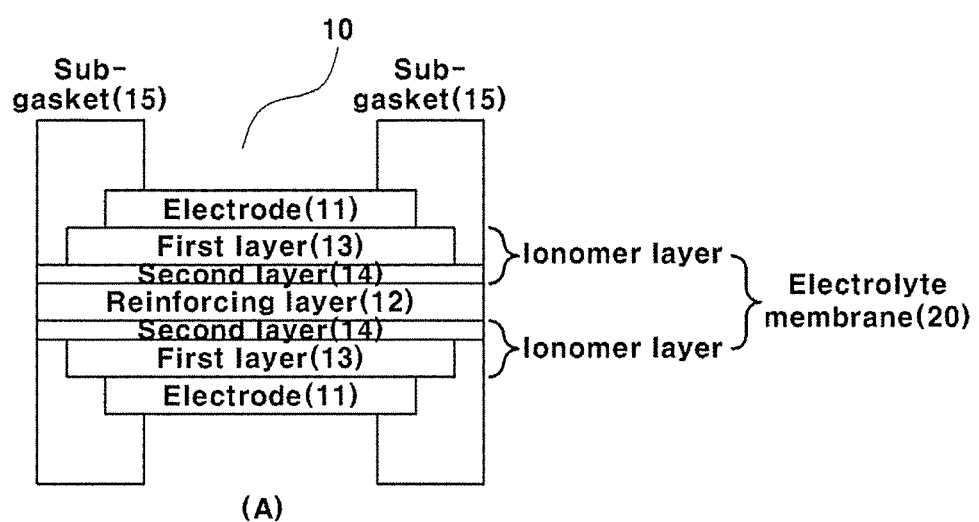
(A)

[FIG. 10]
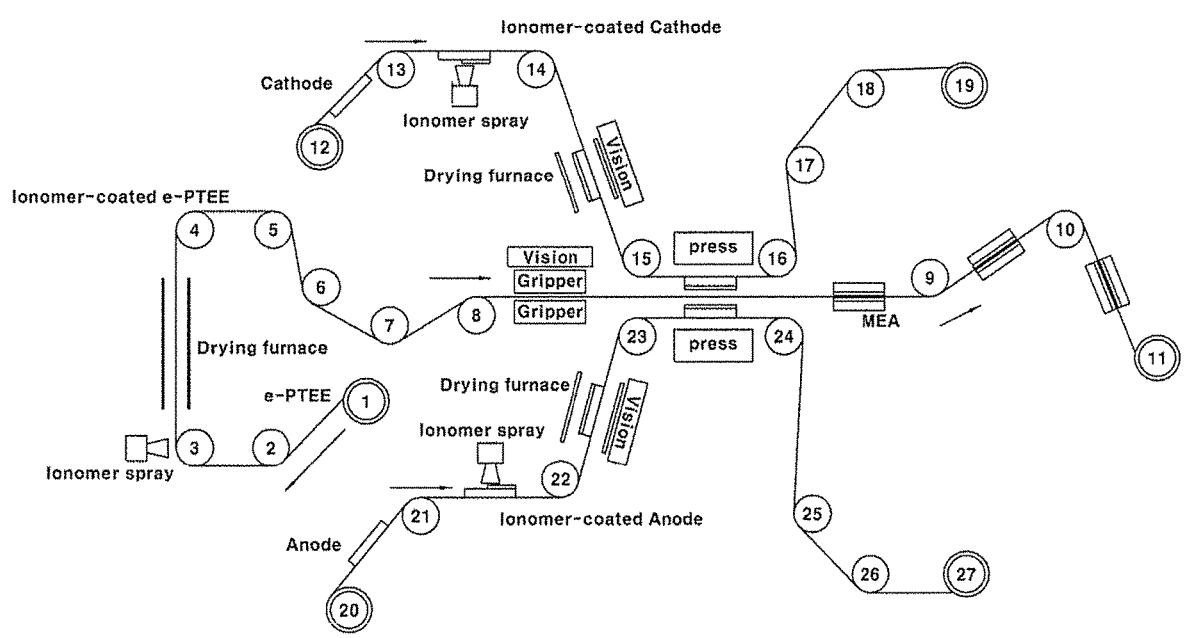

[FIG. 11]
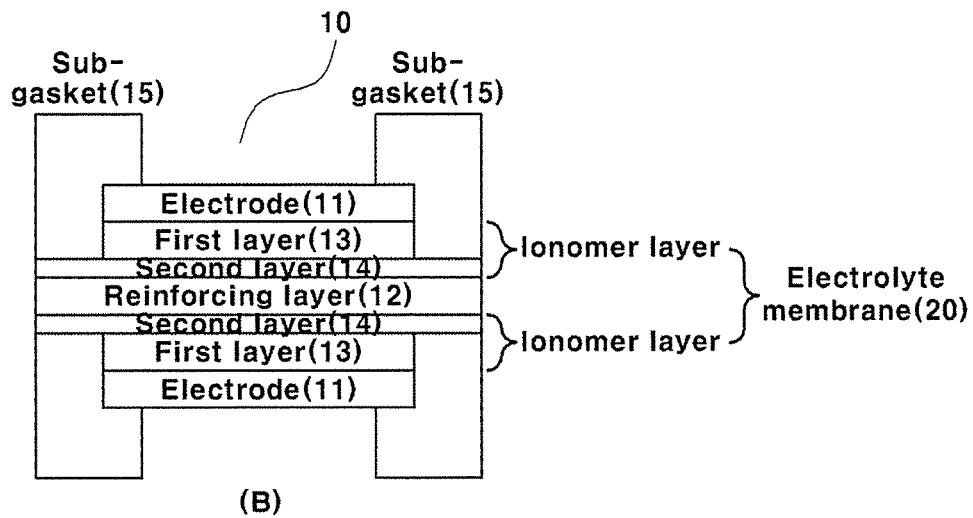
(B)
[FIG. 12]
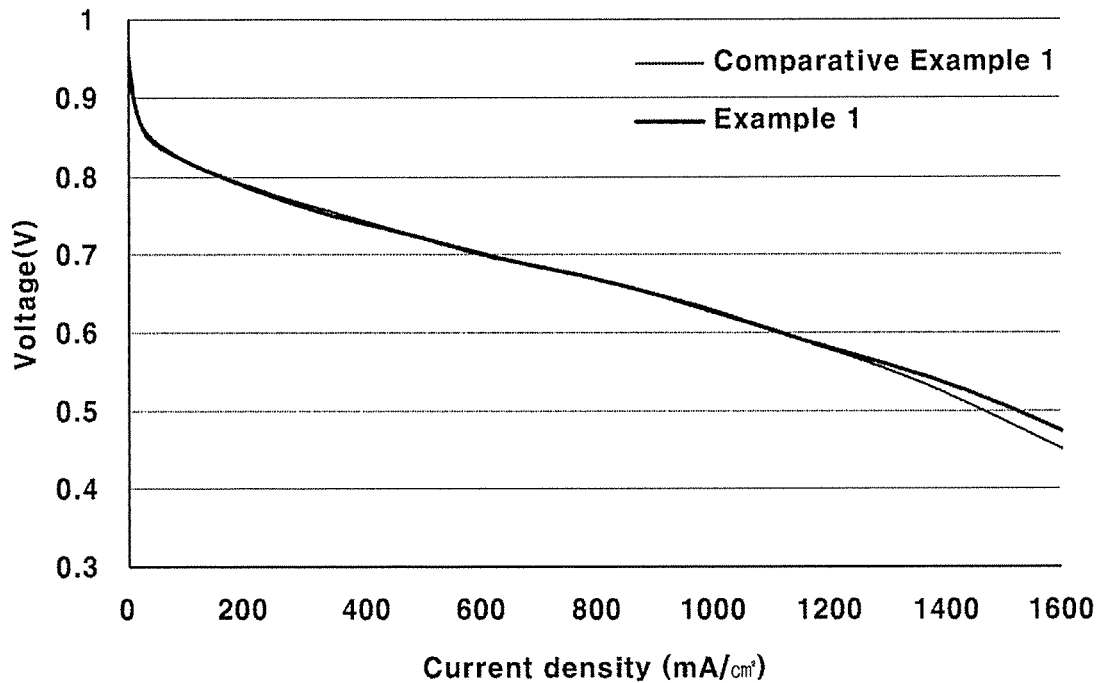

[FIG. 13]
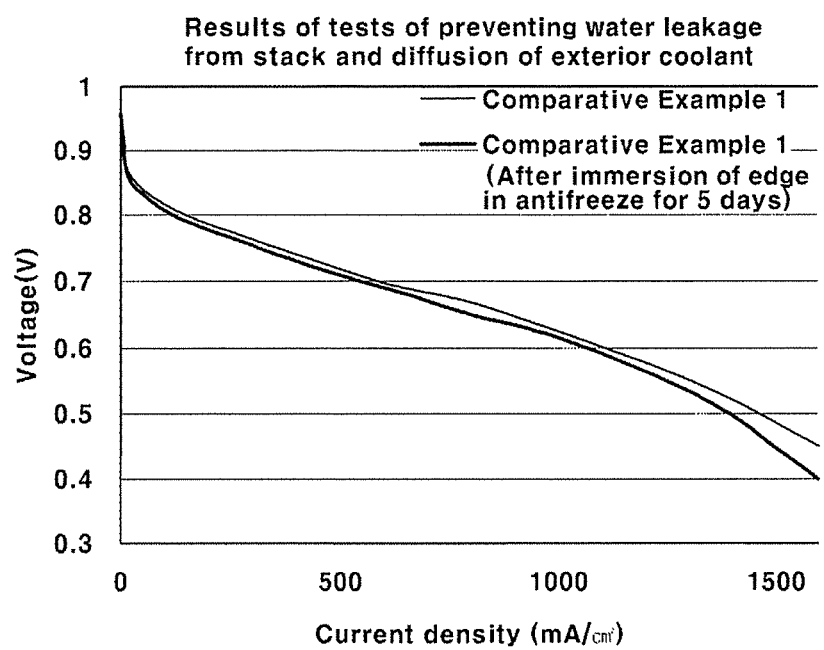
(a) Comparative Example 1
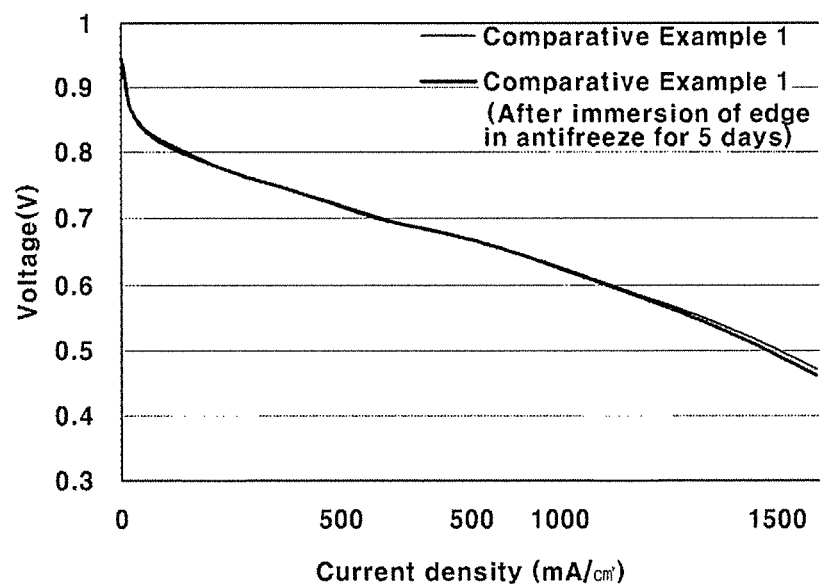
(b) Example 1

[FIG. 14]
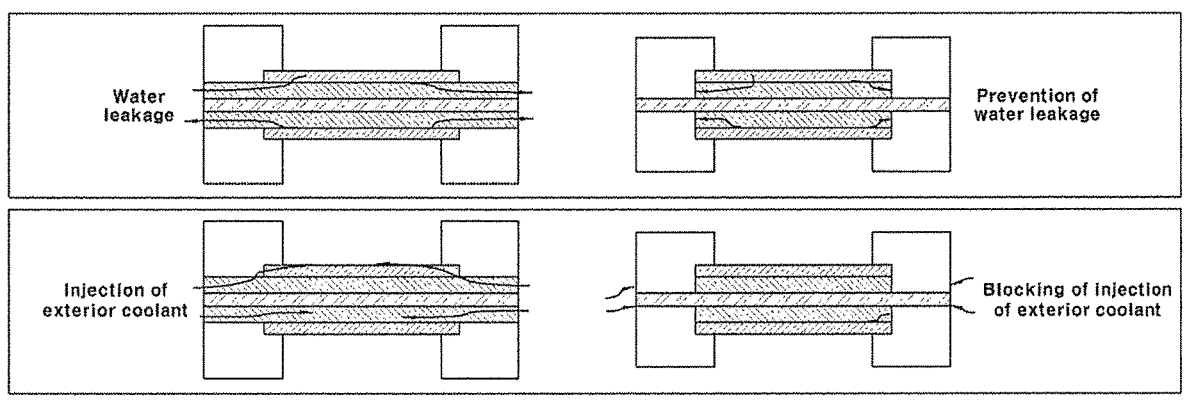

MEMBRANE ELECTRODE ASSEMBLY FOR FUEL CELLS AND METHOD OF MANUFACTURING THE MEMBRANE ELECTRODE ASSEMBLY FOR FUEL CELLS

CROSS-REFERENCE TO RELATED APPLICATION

This application claims, under 35 U.S.C. § 119(a), the benefit of priority to Korean Patent Application No. 10-2017-0077549, filed on Jun. 19, 2017 with the Korean Intellectual Property Office, the entire contents of which are incorporated herein by reference.

TECHNICAL FIELD

The present disclosure relates to a membrane electrode assembly (MEA) and a method of manufacturing the same. More particularly, the present disclosure relates to a membrane electrode assembly (MEA) having a first layer which has a smaller cross-sectional area than that of a reinforcing layer provided with a second layer.

BACKGROUND

In general, a membrane electrode assembly (MEA) for fuel cells includes electrodes (anode and cathode) and an electrolyte membrane, and has increased performance and durability as bonding between each electrode and the electrolyte membrane increases.

As conventional technology to improve such physical properties, Korean Patent Laid-open No. 2016-71800 discloses a method of manufacturing a membrane electrode assembly for fuel cells which suppresses shrinkage and expansion of a membrane electrode assembly by pre-treating an electrolyte membrane at a high or low temperature before bonding the membrane electrode assembly, so as to reduce interfacial stress and enhance the interfacial bonding strength of the membrane electrode assembly, and thereby improve durability.

Meanwhile, a polymer electrolyte membrane fuel cell (PEMFC) generates electricity in accordance with the mechanism depicted in FIG. 1. As shown in FIG. 1, the following reactions occur in areas where electrodes exist:

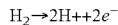

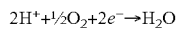

At this time, the electrolyte membrane functions to transfer hydrogen ions produced in the anode to the cathode. When the size of the electrode is larger than that of the electrolyte membrane, the cathode contacts the anode, thus potentially causing a short-circuit. For this reason, the size of the electrolyte membrane should be controlled to be equal to or larger than the size of the electrode so that the cathode does not contact the anode.

The area of the electrolyte membrane larger than the electrode makes handling easy by bonding a sub-gasket thereto. The amount of electrolyte membrane bonded to the sub-gasket is 48 to 57% of the total area. However, this area is unnecessary for the fuel cell mechanism, which involves unnecessary materials.

Accordingly, to offer ionomer savings, the size of the electrolyte membrane produced should be similar to the size of the electrode. However, the polymer electrolyte membrane electrode assembly has drawbacks of difficulty in achieving compactness due to extremely small thickness of an electrode/membrane assembly corresponding to 20 to 100 µm and sensitivity to temperature and humidity, and of low productivity because of no production continuity when produced in a plate shape.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art.

Accordingly, the inventors of the present disclosure found that, when a membrane electrode assembly (MEA) is manufactured by respectively producing an electrode provided with a first layer coated with an ionomer and a reinforcing layer provided with a second layer coated with an ionomer, transferring the same, and bonding using a sub-gasket, it is possible to reduce the amount of ionomer used in the electrolyte membrane, avoid water leakage and reduce thickness as well as manufacturing costs, while the performance of the membrane electrode assembly is equivalent to or higher than a conventional membrane electrode assembly. Thus, these findings led to completion of the present disclosure.

Accordingly, it is one object of the present disclosure to provide a membrane electrode assembly including an electrolyte membrane stacked between different electrodes, wherein an ionomer layer of the electrolyte membrane includes a first layer having at least the same cross-sectional area as an adjacent electrode and a second layer stacked at a side of the first layer and having at least the same area as a reinforcing layer.

In addition, it is another object of the present disclosure to provide a method of manufacturing a membrane electrode assembly (MEA) for fuel cells including (a) coating release paper with an electrode slurry to produce a cathode and an anode, (b) coating the electrode with an ionomer to produce a cathode provided with a first layer and an anode provided with a first layer, (c) coating a reinforcing layer with an ionomer to produce a reinforcing layer provided with a second layer, (d) conducting transfer by placing the reinforcing layer provided with the second layer between the cathode provided with the first layer and the anode provided with the first layer, (e) stacking a sub-gasket by adhesion on each edge of both surfaces of the electrode and the reinforcing layer to produce a membrane electrode assembly, and (f) heat-treating the membrane electrode assembly by application of heat and pressure thereto.

In one aspect, the present disclosure provides a membrane electrode assembly including an electrolyte membrane stacked between different electrodes, wherein an ionomer layer of the electrolyte membrane includes a first layer having at least the same cross-sectional area as an adjacent electrode and a second layer stacked at a side of the first layer and having at least the same area as a reinforcing layer.

In another aspect, the present disclosure provides a method of manufacturing a membrane electrode assembly (MEA) for fuel cells including (a) coating release paper with an electrode slurry to produce a cathode and an anode, (b) coating the electrode with an ionomer to produce a cathode provided with a first layer and an anode provided with a first layer, (c) coating a reinforcing layer with an ionomer to produce a reinforcing layer provided with a second layer, (d) conducting transfer by placing the reinforcing layer provided with the second layer between the cathode provided with the first layer and the anode provided with the first layer, (e) stacking a sub-gasket by adhesion on each edge of both surfaces of the electrode and the reinforcing layer to produce a membrane electrode assembly, and (f) heat-treating the membrane electrode assembly by application of heat and pressure thereto.

Other aspects and exemplary embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a schematic diagram showing an electrode mechanism of a polymer electrolyte membrane fuel cell (PEMFC) according to the related art;

FIG. 2 is a sectional view and a plan view illustrating the structure of a conventional membrane electrode assembly (MEA) according to the related art;

FIG. 3 is an image comparing the conventional membrane electrode assembly (MEA) with a membrane electrode assembly according to exemplary embodiments of the present disclosure;

FIG. 4 is a sectional view and a plan view illustrating the structure of a membrane electrode assembly according to exemplary embodiments of the present disclosure;

FIG. 5A is a schematic diagram showing a method of manufacturing the conventional membrane electrode assembly (MEA) and FIG. 5B is a schematic diagram showing a method of manufacturing the membrane electrode assembly (MEA) according to exemplary embodiments of the present disclosure;

FIG. 6 is a flowchart illustrating a procedure for manufacturing a membrane electrode assembly using the method of manufacturing the conventional membrane electrode assembly (MEA);

FIG. 7 is a flowchart illustrating a procedure for manufacturing a membrane electrode assembly using the method of manufacturing the membrane electrode assembly (MEA) according to exemplary embodiments of the present disclosure;

FIG. 8 is a schematic diagram showing a method of manufacturing the membrane electrode assembly (MEA) according to exemplary embodiments of the present disclosure;

FIG. 9 shows a membrane electrode assembly (MEA) according to exemplary embodiments of the present disclosure;

FIG. 10 is a schematic diagram showing a method of manufacturing the membrane electrode assembly (MEA) according to exemplary embodiments of the present disclosure;

FIG. 11 shows a membrane electrode assembly (MEA) according to exemplary embodiments of the present disclosure;

FIG. 12 shows measurement results of performance of fuel cells according to Test Example 1 according to exemplary embodiments of the present disclosure;

FIG. 13 shows measurement results of effects of blocking water leakage and contaminants according to Test Example 2 according to exemplary embodiments of the present disclosure; and FIG. 14 shows routes of blocking water leakage and contaminants at an edge of the membrane electrode assembly according to exemplary embodiments of the present disclosure.

DETAILED DESCRIPTION

Hereinafter, reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, which may be included within the spirit and scope of the disclosure as defined by the appended claims. In the following description of the present disclosure, detailed descriptions of known functions and configurations incorporated herein will be omitted when it may obscure the subject matter of the present disclosure.

Hereinafter, the present disclosure will be described in detail such that it can be easily implemented by those skilled in the art.

A membrane electrode assembly (MEA) broadly includes an assembly consisting of an electrolyte membrane and electrodes. The membrane electrode assembly (MEA) generally includes a sub-gasket, a cathode, an ionomer layer in an electrolyte membrane, a reinforcing layer in the electrolyte membrane, an ionomer layer in the electrolyte membrane, an anode and a sub-gasket.

In order words, as shown in FIG. 2, the membrane electrode assembly (MEA) has a structure in which electrodes and the sub-gasket are bonded to the electrolyte membrane consisting of the ionomer layer and the reinforcing layer. The sub-gasket is bonded onto the electrode at the boundary between the electrode and the sub-gasket in order to prevent damage.

However, such a general membrane electrode assembly includes an unnecessary ionomer layer and an excess of the ionomer layer causes water leakage of a stack, which leads to destruction of insulation in the stack and creation of mold, and accelerates deterioration of the stack because it serves as a channel for an antifreeze acting as a coolant. Thus, the present disclosure provides a membrane electrode assembly (MEA) to solve this problem.

More specifically, the membrane electrode assembly (MEA) according to the present disclosure includes an electrolyte membrane stacked between different electrodes wherein an ionomer layer of the electrolyte membrane includes a first layer which has at least the same cross-sectional area as an adjacent electrode and a second layer which is stacked at a side of the first layer and has at least the same area as a reinforcing layer.

FIG. 3 is an image comparing a conventional membrane electrode assembly with the membrane electrode assembly according to the present disclosure. The membrane electrode assembly according to the present disclosure can reduce the amount of ionomer in the electrolyte membrane, thereby solving water leakage resulting from water inclusion (absorption) of the ionomer and reducing thickness and manufacturing costs.

FIG. 3 is a sectional view and a plan view illustrating the structure of a conventional membrane electrode assembly 10, wherein ionomer layers 13 and 14 have the same cross-sectional area as the reinforcing layer 12. On the other hand, FIG. 4 is a sectional view and a plan view illustrating the structure of a membrane electrode assembly according to the present disclosure, wherein the first layer 13, which is an ionomer layer contacting the layer electrode 11, has a smaller area than that of the second layer 14, which is an ionomer layer contacting the reinforcing layer, 12 and thus contains less ionomer than the ionomer layer of the second layer 14. Furthermore, the sub-gasket 15 is adhered to each of edges of both surfaces of the electrode 11 and the electrolyte membrane 20.

The first layer 13 has a smaller cross-sectional area than that of the reinforcing layer 12 which has a larger cross-sectional area than that of the electrode 11.

In this case, any material may be used for the reinforcing layer 12 without any limitation so long as it is used in the art, but may be a porous film with a thickness of 3 to 50 μm and made of expanded polytetrafluoroethylene (e-PTFE). When the thickness of the reinforcing layer is less than 3 μm, there is limited applicability to an automated process due to weak tensile strength and when the thickness exceeds 50 μm, there is a limitation of increase in stack size due to increased MEA thickness. Thus, the reinforcing layer having a thickness within the range can be used. At this time, the ionomer may be PFSA or PFIA, but any material may be used without limitation so long as it is used in the art.

Furthermore, the thickness of the first layer 13 can be 3 to 10 μm. When the thickness of the first layer is less than 3 μm, there is a problem of decreased stack efficiency due to increased gas permeation of hydrogen and oxygen, and when the thickness exceeds 10 μm, the first layer acts as a resistance in conducting hydrogen ions, thus causing a problem of decreased stack efficiency. Thus, the first layer may be formed within the thickness range defined above.

The thickness of the second layer 14 can be 1 to 3 μm and may be equivalent to or less than that of the first layer.

The first layer 13 and the second layer 14 are ionomer layers in the electrolyte membrane 20. By removing an unnecessary ionomer layer in the electrolyte membrane, there are effects in that the amount of ionomer used can be reduced by about 45 to about 60% on average as compared to the conventional membrane electrode assembly, and the thickness can be reduced by 10% or more as compared to the conventional membrane electrode assembly.

In addition, the present disclosure provides a method of manufacturing the membrane electrode assembly (MEA) for fuel cells.

FIG. 5A is a schematic diagram showing a method of manufacturing the conventional membrane electrode assembly (MEA), which shows that the conventional membrane electrode assembly (MEA) includes (a) electrode coating, (b) electrode transfer, (c) sub-gasket bonding, and (d) MEA heating. More specifically, the electrode coating (a) is an operation of applying an electrode onto release paper to a small thickness of 1 to 10 μm, and electrode transfer (b) is an operation of transferring the coated electrode to an electrolyte membrane to form a MEA. The sub-gasket bonding (c) is an operation of adhering a sub-gasket to the outside of the MEA such that the electrode is exposed. The MEA heating (d) is an operation of fixing the MEA having the sub-gasket bonded thereto into a more stable state by application of heat and pressure. Furthermore, FIG. 6 is a flowchart illustrating a procedure for manufacturing a membrane electrode assembly using the method of manufacturing the conventional membrane electrode assembly (MEA).

These conventional processes follow a roll-to-roll process which allows for continuous process and advantageously exhibits high productivity. However, each process makes it difficult to control the electrolyte membrane sensitive to humidity, thus disadvantageously having harsh manufacturing conditions. In addition, in order to produce the ideal membrane electrode assembly as shown in FIG. 4, the electrolyte membrane should be equivalent to the size of the electrode and the electrode should be bonded to the exposed area of the sub-gasket. However, it is extremely difficult to achieve these conditions.

Therefore, in an attempt to prepare the ideal membrane electrode assembly shown in FIG. 4, the present disclosure provides a method of manufacturing a membrane electrode assembly (MEA) for fuel cells which includes: (a) coating release paper with an electrode slurry to produce a cathode and an anode; (b) coating the electrode with an ionomer to produce a cathode provided with a first layer and an anode provided with a first layer; (c) coating a reinforcing layer with an ionomer to produce a reinforcing layer provided with a second layer; (d) conducting transfer by placing the reinforcing layer provided with the second layer between the cathode provided with the first layer and the anode provided with the first layer; (e) stacking a sub-gasket by adhesion onto each edge of both surfaces of the electrode and the reinforcing layer to produce a membrane electrode assembly; and (f) heat-treating the membrane electrode assembly by application of heat and pressure thereto. FIG. 5B is a schematic diagram showing a method of manufacturing the membrane electrode assembly (MEA) according to the present disclosure.

Through the roll-to-roll process according to the present disclosure, it is possible to manufacture a membrane electrode assembly which has an optimal structure to maintain high productivity, reduce manufacturing costs and improve stack efficiency. Furthermore, a procedure of manufacturing a membrane electrode assembly using the method of manufacturing the conventional membrane electrode assembly (MEA) will be described with reference to FIG. 7. Respective processes will be described below.

First, electrode production is carried out by coating release paper with an electrode slurry and drying the same for electrode production (step (a)). At this time, the electrode is a cathode or an anode and any cathode slurry or anode slurry may be used without any limitation so long as it is used in the art.

Then, the electrode prepared by coating the slurry and drying is coated with an ionomer to produce a cathode provided with a first layer and an anode provided with a first layer (step (b)). The coating the electrode with the ionomer may be carried out using a sprayer, a bar coater, a slot die coater or an E-sprayer.

In particular, a bar coater or slot die coater can be used in order to evenly coat the surface of the electrode with the ionomer, and a sprayer or E-sprayer can be used in order to maintain the composition of ionomer present in the electrode and coat an extremely small amount of ionomer.

After forming an ionomer layer as a first layer on the electrode, an ionomer layer is formed as a second layer on the reinforcing layer (step (c)).

Any reinforcing layer may be used in the present disclosure without limitation so long as it can be used in the art, but it can be a porous film having a thickness of 3 to 50 μm and made of expanded polytetrafluoroethylene (e-PTFE). Like in formation of the ionomer layer on the electrode, in the formation of ionomer layer on the reinforcing layer, the ionomer can be coated using a sprayer, a bar coater, a slot die coater or an E-Sprayer.

Meanwhile, polytetrafluoroethylene (PTFE) is extremely difficult to bond to other materials due to high release property. Since such release property makes bonding between the electrode and the polytetrafluoroethylene (PTFE) difficult, a sprayer or slot die coater can be used. The coated ionomer imparts stickiness to both surfaces of the reinforcing layer and enables the electrode to be transferred.

In particular, the expanded polytetrafluoroethylene (e-PTFE) has numerous pores and allows an ionomer sprayed from one side to spread to the other side, thus increasing process efficiency. Thus, a sprayer can be used in the case of coating the reinforcing layer of this material with an ionomer.

Then, transfer is conducted while the reinforcing layer provided with the second layer is placed between the cathode provided with the first layer and the anode provided with the first layer (step (d)). After the electrode is bonded to the reinforcing layer by transfer, the first layer 13 forms an ionomer layer which has a smaller cross-sectional area than that of the reinforcing layer 12 having a larger cross-sectional area than that of the electrode. A step may be created between the first layer 13, the ionomer layer of the electrode 11, and the second layer 14 of the reinforcing layer.

At this time, the transfer can be carried out using roll-pressing at a temperature of 90 to 120° C., a pressure of 40 to 130 kgf, and a rate of 0.1 to 1.0 m/min. When the temperature is lower than 90° C., there is a problem in that the electrode is not transferred at a temperature lower than the glass transition temperature of the ionomer, and when the temperature is higher than 120° C., a temperature higher than the glass transition temperature of the ionomer causes damage to the MEA. When the pressure is lower than 40 kgf, there is a limitation in that pressing between the electrode and the electrolyte membrane is not performed smoothly, and when the pressure is higher than 130 kgf, expressive pressure applied to the electrode and the electrolyte membrane may cause damage to the MEA. When the rate is less than 0.1 m/min, heat and pressure from the roll press are applied to the MEA for a long time, thus causing damage to products, and when the rate is lower than 1.0 m/min, insufficient heat and pressure from the roll press are applied to the MEA, thus making it impossible to manufacture products. Thus, transfer can be conducted within the condition ranges defined above.

The reinforcing layer coated with an ionomer during transfer can be transferred by stacking with an electrode coated with an ionomer or an electrode not coated with an ionomer, while the reinforcing layer not coated with an ionomer cannot be transferred by stacking with an electrode coated with an ionomer or an electrode not coated with an ionomer. Accordingly, formation of the reinforcing layer coated with the ionomer is important.

Alternatively, the transfer process may be carried out using a plate press. At this time, the transfer is carried out under the conditions that the temperature is 100 to 180° C., the pressure is 0.1 to 10.0 MPa, and the time is 10 to 300 seconds. Since the plate press applies a lower pressure per unit area than the roll press, production should be conducted by exposure to a higher temperature for a longer time.

After transfer, a sub-gasket is stacked and bonded on the edge of both surfaces of the electrode and the reinforcing layer to form a membrane electrode assembly (MEA) (step (e)).

The produced membrane electrode assembly is heat-treated by application of heat and pressure to produce a final electrode membrane electrode assembly product (step (f)). At this time, the method of bonding the membrane electrode assembly (MEA) can be a roll or plate press process. In the case of the roll press process, the electrode size can be controlled to a desired level using a pattern roll, and in the case of the plate press process, the size of electrode can be controlled to a desired level using an embossed plate.

In an embodiment, the membrane electrode assembly shown in FIG. 9 can be produced using the roll-to-roll process shown in FIG. 8. More specifically, a reinforcing layer made of e-PTFE is mounted on rolls Nos. 1 to 11, the cathode is mounted on rolls Nos. 12 to 19 and the anode is mounted on rolls Nos. 20 to 27. The e-PTFE is unwound on roll No. 1, and the ionomer is coated and dried while moving from roll No. 3 to roll No. 4.

While the ionomer-coated e-PTFE is moved from roll No. 8 to roll No. 9, the cathode and the anode are bonded to produce a membrane electrode assembly (MEA). At this time, since e-PTFE is thin and thus easily changed in shape, a gripper is mounted to fix the e-PTFE and prevent dimensional change. The membrane electrode assembly thus produced is cooled and rewound while passing through rolls Nos. 10 and 11.

Then, the cathode is unwound from roll No. 12, and the ionomer is coated thereon while passing through rolls Nos. 13 and 14 and dried while passing through rolls Nos. 14 and 15. The cathode was transferred to ionomer-coated e-PTFE through rolls Nos. 15 and 16 and delaminated while passing through rolls Nos. 16 and 17. The transferred release paper is rewound through roll No. 19.

Then, the anode is unwound from roll No. 20 and the ionomer is coated while passing through rolls Nos. 21 and 22 and dried while passing through rolls Nos. 22 and 23. The anode was transferred to ionomer-coated e-PTFE through rolls Nos. 23 and 24 and delaminated while passing through rolls Nos. 24 and 25. The transferred release paper is rewound through roll No. 27 to produce a membrane electrode assembly.

In another embodiment, the membrane electrode assembly shown in FIG. 11 can be produced using the roll-to-roll process shown in FIG. 10.

More specifically, a reinforcing layer made of e-PTFE is mounted on rolls Nos. 1 to 11, the cathode is mounted on rolls Nos. 12 to 19 and the anode is mounted on rolls Nos. 20 to 27. The e-PTFE is unwound from roll No. 1, and the ionomer is coated and dried while moving from roll No. 3 to roll No. 4. At this time, the ionomer is pattern-coated in an area equivalent to the size of the electrode.

While the ionomer-coated e-PTFE moves from roll No. 8 to roll No. 9, the cathode and the anode are bonded to produce a membrane electrode assembly. Since e-PTFE is thin and thus easily changed in shape, a gripper is mounted to fix the e-PTFE and prevent dimensional change. In terms of alignment of the electrodes and e-PTFE, the start and the end thereof can be adjusted by a vision. The membrane electrode assembly thus produced is cooled and rewound while passing through rolls Nos. 10 and 11.

Then, the cathode is unwound from roll No. 12 and the ionomer is coated while passing through Nos. 13 and 14 rolls and dried while passing through rolls Nos. 14 and 15. A vision is installed between rolls Nos. 14 and 15 to control alignment such that the electrode can be supplied to the e-PTFE-transferred area. The cathode is transferred to ionomer-coated e-PTFE through rolls Nos. 15 and 16 and is delaminated while passing through rolls Nos. 16 and 17. The transferred release paper is rewound through roll No. 19.

Then, the anode is unwound from roll No. 20 and the ionomer is coated while passing through rolls Nos. 21 and 22 and dried while passing through rolls Nos. 22 and 23. A vision is installed between rolls Nos. 22 and 23 to control alignment such that the electrode can be supplied to the e-PTFE-transferred area. The anode was transferred to ionomer-coated e-PTFE through rolls Nos. 23 and 24 and delaminated while passing through rolls Nos. 24 and 25. The transferred release paper is rewound through roll No. 27 to produce a membrane electrode assembly.

Accordingly, the membrane electrode assembly (MEA) manufactured by the method according to the present disclosure includes an electrolyte membrane stacked between different electrodes, wherein an ionomer layer of the electrolyte membrane includes a first layer having at least the same cross-sectional area as an adjacent electrode; and a second layer stacked at a side of the first layer and having at least the same area as a reinforcing layer, thereby removing unnecessary ionomer layers in the electrolyte membrane.

Therefore, the membrane electrode assembly according to the present disclosure can reduce the amount of ionomer used by about 45% to about 60% on average as compared to the conventional membrane electrode assembly, and reduce the thickness by 10% or more as compared to the conventional membrane electrode assembly, thereby being widely used in fuel cells.

Hereinafter, the present disclosure will be described in more detail with reference to examples. However, these examples are provided only for illustration of the present disclosure and should not be construed as limiting the scope of the present disclosure.

Example 1

Release paper was coated with an electrode slurry to prepare a cathode 11 and an anode 11, a reinforcing layer 12 provided with a second layer 14 was placed between a cathode provided with a first layer 13 and an anode provided with a first layer 13 according to conditions shown in Table 1, and the reinforcing layer 12 was bonded to the electrodes using a roll-to-roll process at a temperature of 110° C., at a pressure of 130 kgf and at a rate of 0.2 m/min (total thickness of electrolyte membrane 20 is 15 μm). A sub-gasket 15 was bonded to the area excluding the electrode at a pressure of 110° C., a pressure of 130 kgf and a rate of 1.0 m/min, to prepare a membrane electrode assembly shown in FIG. 4B.

Comparative Example 1

A membrane electrode assembly shown in FIG. 2 was prepared according to the conditions shown in Table 1 below in the same manner as in Example 1. The total thickness of the electrolyte membrane 20 was 15 μm which is the same as in Example 1.

Test Example 1: Measurement of Performance of Fuel Cells

The performance of a fuel cell at RH 100% and at 65° C. was measured for Example 1, the membrane electrode assembly shown in FIG. 4B, and Comparative Example 1, the conventional membrane electrode assembly shown in FIG. 2, and results are shown in the following Table 1 and FIG. 12.

TABLE 1

| Item | | Comparative Example 1 | Item | | Example 1 | Others |
|---|---|---|---|---|---|---|
| Electrolyte membrane (20) | Conditions of reinforcing layer (width × length × height) | 8 cm × 8 cm × 5 μm | Electrolyte membrane (20) | Conditions of reinforcing layer 12 (width × length × height) | 8 cm × 8 cm × 5 μm | 57% decrease in amount of used ionomer |
| | Conditions of ionomers (13, 14) (width × length × height) | 8 cm × 8 cm × 5 μm | | Conditions of second layer 14 (width × length × height) | 8 cm × 8 cm × 1 μm | |
| | | | | Conditions of first layer 13 (width × length × height) | 5.2 cm × 5.2 cm × 4 μm | |
| | Total thickness of electrolyte membrane | 15 μm | | Total thickness of electrolyte membrane | 15 μm | — |
| | Total thickness of MEA | 85 μm | | Total thickness of MEA | 75 μm | 10% decrease in total thickness |
| Performance results of fuel cells | | 0.6245 V | Performance results of fuel cells | | 0.6302 V | Equal to or higher than |

\* The electrode 11 and sub-gasket 15 of Comparative Example 1 and Example 1 are the same As can be seen from results of Table 1, FIG. 12 and Example 1, the membrane electrode assembly according to the present disclosure, exhibited equivalent or similar fuel cell performance as compared to Comparative Example 1, the conventional membrane electrode assembly.

Accordingly, it can be seen that the membrane electrode assembly manufactured by the method according to the present disclosure can reduce the amount of ionomer used by 45% to 60% on average, as compared to the conventional membrane electrode assembly, and reduce the thickness by 10% or higher as compared to the conventional membrane electrode assembly, thus being widely used for fuel cells.

Test Example 2: Effects of Blocking Water Leakage and Contaminants

For Example 1, the membrane electrode assembly shown in FIG. 4B and Comparative Example 1, the conventional membrane electrode assembly shown in FIG. 2, to confirm the effects of blocking water leakage and transfer of contaminants at the edge, an antifreeze was placed under the membrane electrode assembly which was subjected to testing of performance of fuel cells and allowed to stand for 5 days. After that, a performance evaluation was conducted.

The results of FIG. 13 showed that, in Example 1, the antifreeze did not permeate into the stack and there was thus no change in performance, while Comparative Example 1 showed contamination and thus deterioration in performance. For reference, FIG. 14 shows routes of blocking water leakage and transfer of contaminants at the edge of the membrane electrode assembly.

The membrane electrode assembly and a method of manufacturing the same according to the present disclosure have the following advantages.

1) The conventional membrane electrode assembly absorbs water produced therein due to water absorption (inclusion) of ionomer and diffuses the same outside the stack, thus causing destruction of insulation in the stack and creation of mold in the stack (see FIG. 3), while the membrane electrode assembly according to the present disclosure removes an ionomer layer connected to the outside of the stack, thereby advantageously blocking a channel through which moisture moves and preventing water leakage from the fuel cell stack.

2) By removing unnecessary ionomer layer in the electrolyte membrane, the amount of ionomer used can be reduced by 45% to 60% on average, as compared to the conventional membrane electrode assembly, and the thickness can be reduced by 10% or higher as compared to the conventional membrane electrode assembly.

3) The reduction of amount of ionomer used leads to reduction of material costs, thereby improving manufacturing efficiency.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of manufacturing a membrane electrode assembly (MEA) for fuel cells comprising:
    (a) coating release paper with an electrode slurry to produce a cathode and an anode:
    (b) coating the cathode and the anode with a cathode-side first ionomer layer and an anode-side first ionomer layer, respectively;
    (c) coating each of two opposing sides of a reinforcing layer with a second ionomer layer;
    (d) conducting transfer by placing the reinforcing layer coated with the second ionomer layers between the cathode coated with the cathode-side first ionomer layer and the anode coated with the anode-side first ionomer layer;
    (e) stacking a sub-gasket by adhesion on each edge of opposing surfaces of a stacked group of the cathode coated with the cathode-side first ionomer layer, the anode coated with the anode-side first ionomer layer, and the reinforcing layer coated with the second ionomer layers to produce a membrane electrode assembly; and
    (f) heat-treating the membrane electrode assembly by application of heat and pressure thereto,
    wherein each of the cathode-side first ionomer layer and the anode-side first ionomer layer has a smaller cross-sectional area than a cross-sectional area of the reinforcing layer,
    wherein a thickness of each of the second ionomer layers is less than a thickness of each of the cathode-side first ionomer layer and the anode-side first ionomer layer,
    wherein each of the cathode-side first ionomer layer and the anode-side first ionomer layer has a larger cross-sectional area than each cross-sectional area of the cathode and the anode, and
    wherein the cathode-side first ionomer layer is in direct contact with one of the second ionomer layers and the anode-side first ionomer layer is in direct contact with the other of the second ionomer layers.

2. The method according to claim 1, wherein the reinforcing layer coated with the second ionomer layers includes a porous film having a thickness of 3 to 50 μm and made of expanded polytetrafluoroethylene(e-PTFE).

3. The method according to claim 1, wherein the formation of the cathode-side, anode-side, and second ionomer layers in steps (b) and (c) is carried out using spraying.

4. The method according to claim 1, wherein the transfer of step (d) is carried out using roll pressing at a temperature of 90 to 120° C., a pressure of 40 to 130 kgf, and a rate of 0.1 to 1.0 m/min, or using plate pressing at a temperature of 100 to 180° C. and a pressure of 0.1 to 10.0 MPa, for 10 to 500 seconds.

5. The method according to claim 1, wherein the bonding of the membrane electrode assembly (MEA) in steps (e) and (f) is carried out using roll pressing or plate pressing.

6. A method of manufacturing a membrane electrode assembly (MEA) for fuel cells comprising:
    (a) coating release paper with an electrode slurry to produce a cathode and an anode:
    (b) coating the cathode and the anode with a cathode-side first ionomer layer and an anode-side first ionomer layer, respectively;
    (c) coating each of two opposing sides of a reinforcing layer with a second ionomer layer;
    (d) conducting transfer by placing the reinforcing layer coated with the second ionomer layers between the cathode coated with the cathode-side first ionomer layer and the anode coated with the anode-side first ionomer layer;
    (e) stacking a sub-gasket by adhesion on each edge of opposing surfaces of a stacked group of the cathode coated with the cathode-side first ionomer layer, the anode coated with the anode-side first ionomer layer, and the reinforcing layer coated with the second ionomer layers to produce a membrane electrode assembly; and
    (f) heat-treating the membrane electrode assembly by application of heat and pressure thereto,
    wherein each of the cathode-side first ionomer layer and the anode-side first ionomer layer has a smaller cross-sectional area than a cross-sectional area of the reinforcing layer,
    wherein a thickness of each of the second ionomer layers is less than a thickness of each of the cathode-side first ionomer layer and the anode-side first ionomer layer,
    wherein each of the cathode-side first ionomer layer and the anode-side first ionomer layer has a larger cross-sectional area than each cross-sectional area of the cathode and the anode, and
    wherein the cathode-side first ionomer layer is disposed between the reinforcing layer and the cathode, and the anode-side first ionomer layer is disposed between the reinforcing layer and the anode.

* * * * *